UNITED STATES PATENT OFFICE.

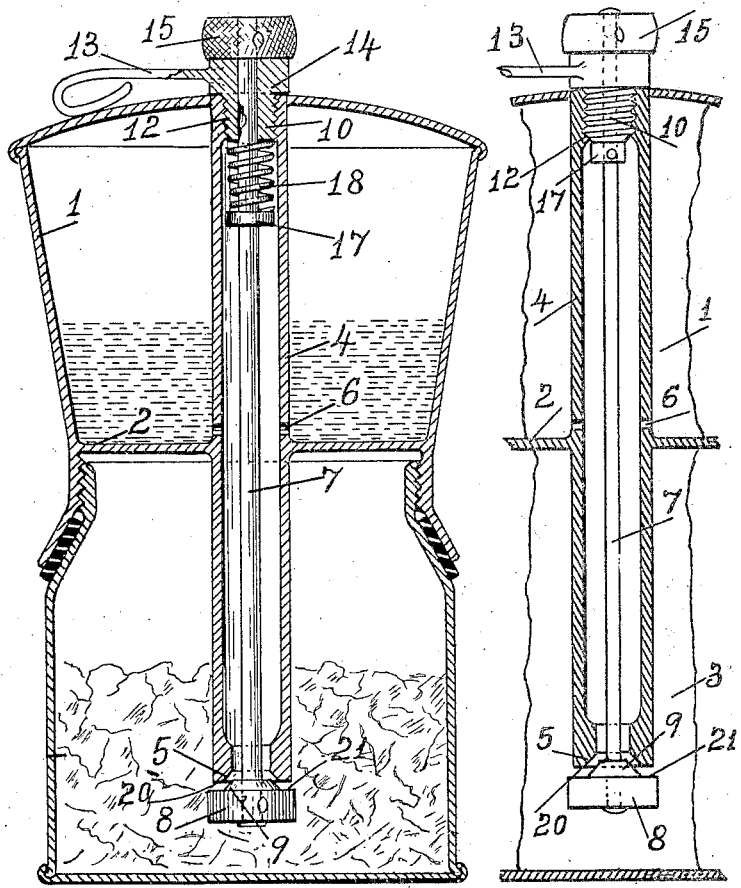

GEORGE R. SHANKLIN, OF SPRINGFIELD, ILLINOIS.

VALVE.

1,357,595.  Specification of Letters Patent.  Patented Nov. 2, 1920.

Application filed June 2, 1917. Serial No. 172,559.

*To all whom it may concern:*

Be it known that I, GEORGE R. SHANKLIN, a citizen of the United States, residing at Springfield, in the county of Sangamon and State of Illinois, have invented a new and useful Valve, of which the following is a specification.

My invention relates to valves and more particularly straight-line valves, of the type adapted for use within a vessel or container having chambers intercommunicating through the valve and also adapted to be operated from the outside of the vessel to control the flow of liquid from one chamber into the other and to grind the valve plug on the valve seat. I have shown and will describe the invention as applied to an acetylene lamp; but it is applicable with equal advantage to other structures having chambers intercommunicating in a straight line through the valve.

The purposes of the invention are to provide a straight-line valve-body; to provide means external to the containing structure, for moving the valve plug toward or away from the valve seat; to provide means external to the containing structure, for rotating and grinding the valve plug on the valve seat; to provide in operative association with a straight line valve body, of a screw plug of improved construction and in conjunction therewith to provide means for normally holding the valve slightly open when the screw plug is at the limit of its inward movement in the valve-body and adapted to completely close the valve upon outward movement of the screw-plug in the valve-body.

The invention is illustrated in the annexed drawing to which reference is hereby made and will now be described and finally recited in the claims.

Figure 1 is a longitudinal sectional view of the valve in connection with an acetylene lamp of usual construction; and Fig. 2 is a longitudinal sectional view of a valve of modified construction.

The same reference numerals designate the same parts in both views.

The container in the present instance is a water reservoir 1 having a transverse diaphragm 2 and the receiver is a carbid box 3 which screws into the lower part of the reservoir and has gas-tight connection therewith. The tubular valve-body 4 is rigidly connected with the reservoir and extends downwardly into the carbid box and has at its lower end a flared part 5 and a terminal flat valve seat 20.

Openings 6 admit water from the reservoir into the valve body. A central valve stem 7 extends through the valve body and beyond both ends thereof. A valve plug 8 is rigid on the stem 7 and has a flat part 21 adapted to seat on the flat valve-seat 20 when the stem is moved outwardly and adapted to grind on the seat 20 when the stem is rotated with the part 21 in contact with the part 20. The tapered part 9 of the plug 8 is adapted to engage on the flared part 5 of the valve-body to keep the plug in line with the valve-body.

A screw plug 10 engages in the screw threads 12 on the inside of the valve-body 4 and has a central bore 14 in which the stem 7 is free to rotate and slide, and also has a handle 13 for rotating the screw plug in one direction to move it inwardly in the valve-body and rotating it in the opposite direction to move it outwardly in the valve-body.

A knob 15 is fixed on the stem 7, adjacent to the outer end of the head of the screw plug 10 and in such relation thereto that if the screw plug be moved outwardly in the valve-body the head of the screw plug will act on the knob to slide the stem 7 outwardly to cause the flat part 21 of the plug to make close contact with the flat valve seat 20 to completely close the valve; and reverse rotation of the screw plug will permit the valve stem 7 to move inwardly to open the valve more or less according to the scope of rotation of the screw-plug. A collar 17 is preferably integral with the stem 7. A spring 18 surrounds that part of the stem 7 which is between the inner end of the screw-plug 10 and the outer end of the collar 17. The spring is normally compressed when the screw-plug is at the limit of its inward movement and pushes against the collar 17 to maintain constant contact of the inner end of the knob 15 with the outer end of the screw-plug 10. When the screw-plug 10 has been screwed inward to the full extent the spring will act to keep the valve-plug 8 a little distance away from the inner end of the valve-body 4, and the spring 18 pushing against the collar 17 will keep the inner end of the knob 15 in contact with the outer end of the screw-plug and will keep the valve slightly open as shown in Fig. 1. If the screw-plug 10 be then screwed outwardly the outer end of the screw-plug will push against the inner end of the knob to cause the stem 7 to pull on the plug 8 to cause further compression of the spring 18 and complete the closing of the valve.

I am aware that a screw rigid on a valve-stem has been employed to move the valve-stem spirally in one longitudinal direction of a tube surrounding the valve-stem, to open the valve and to move the valve-stem spirally in the opposite direction to close the valve; that construction is however objectionable because the valve-plug at the inner terminal of the tube is not effective to grind the entire contacting circular surfaces of the valve-plug and the valve-seat during one complete rotation of the valve-plug in either direction. Less than one complete rotation will cause the valve-plug to bind and stop on the valve-seat and reverse initial partial spiral rotation of the stem will withdraw the valve-plug from the valve-seat so there cannot be any grinding action.

A practical advantage of the construction herein shown and described is that the valve-stem being rotative and slidable longitudinally by hand, independently of the screw-plug, the valve-plug, rigid on the valve-stem, may be rotated as many times as may be necessary to grind the entire contacting surfaces of the valve-plug and the valve-seat, and the operator may, by the sense of touch, know that the grinding of the entire contacting surfaces is being properly effected. A distinction to be noted is that my construction admits of straight line opening and closing movement of the valve-plug, as distinguished from the spiral movement hitherto employed, and admits of manual sliding and rotation of the valve-stem independently of the screw-plug.

To grind the valve the screw-plug 10 will be screwed inward to cause the spring to act on the collar 17 to slide the stem inward to slightly open the valve; the knob 15 will then be pulled outwardly to cause the part 21 to bear against the part 20 and the knob will then be rotated by hand to cause the part 21 to grind on the part 20.

In the modified construction shown in Fig. 2 the spring 18 (Fig. 1) will be dispensed with and the collar 17 will be secured on the stem 7 in such exact and close position relative to the inner end of the screw-plug and the inner end of the knob 15, that if the screw-plug be screwed outwardly the outer end of the screw-plug will act on the inner end of the knob to slide the stem 7 outwardly, to close the valve; and if the screw-plug be screwed inwardly the inner end of the screw-plug will push against the collar 17 to cause the stem 7 to move inwardly, to open the valve.

The compartment or vessel containing the liquid is called the container, and the compartment or vessel into which the liquid is conveyed is called the receiver.

Having fully described my invention, what I claim as new and desire to secure by Letters Patent is:

1. In a valve of the class described, the combination of a tube adapted to be fixed in and extend through a container into a receiver, and having a valve-seat at its discharge terminal; a screw-plug adapted to screw into the outer end of the tube and having a central bore; a valve-stem extending through and adapted to slide and rotate in the bore of the screw-plug; a collar on the valve-stem; a valve-plug fixed on the valve-stem and adapted to make a plurality of rotations on and grind the terminal valve-seat of the tube; a knob fixed on the valve-stem and adapted to be engaged by the outer end of the screw plug; and a spring surrounding the valve stem between the collar and the inner end of the screw-plug and normally tending to keep the valve open and compressible by pulling the valve-stem outwardly by hand to engage the valve-plug on the valve-seat and admit of manual rotation of the valve-stem by means of the knob, independently of the screw-plug, to effect complete rotations of the valve-plug on the valve-seat with a manually controlled pressure sensible to touch.

2. In an acetylene lamp, a straight line valve construction, comprising a tubular valve body having a valve seat at one terminal, internal screw threads at the other terminal, and an intermediate intake opening; a screw plug adapted to engage the screw threads of the valve body and having a central longitudinal bore; a valve stem adapted to rotate and slide in the central bore of said screw plug and having a collar within the valve body; a tapered valve plug fixed to one end of the valve stem and adapted to engage on the terminal valve seat of the valve body; means on the valve stem for operating the same; and a spiral spring surrounding the valve stem between the collar thereon and the inner end of the screw plug to normally maintain the valve plug out of engagement with its seat.

3. In an acetylene lamp, the combination of a container divided by a horizontal partition into an upper water chamber and a lower carbid chamber, a vertically disposed tube substantially free from projections and extending from the top wall of the container centrally through the partition and terminating at a point adjacent to, but spaced above the bottom wall of the container, said tube terminating at its lower end in a valve seat, and having a water inlet opening at a point adjacent to but above the partition, a plug threaded to the interior wall at the upper end of the tube and having a hand engaging part above the top wall of the container whereby to be adjusted vertically with respect to the tube, said plug having a central opening, a valve stem loosely projecting through said central opening for relative rotatable and vertical movement, said valve stem having at its lower end which projects below the lower end of the tube and terminates short of the bottom of the container, a valve disk, means for normally spacing the valve disk from its seat on the tube comprising a spring interposed between the plug and fixed part of the valve stem, and means for rotating and moving the stem longitudinally whereby to seat and grind the valve and valve seat comprising a hand part secured to the upper end of the stem.

4. In an acetylene lamp, the combination of a straight line valve construction, comprising a tubular valve body having a valve seat at one terminal and an intake opening intermediate its ends; an adjusting screw plug adapted to screw into the tubular valve body and having a longitudinal central bore, the tubular body constituting a housing for the threaded part of the plug; a valve stem extending longitudinally through the valve body and through the bore of the screw plug and adapted to rotate in the bore of the screw plug; a valve plug fixed on the valve stem and adapted to engage the terminal valve seat of the valve body; a spring interposed between the plug and a fixed part of the stem and a knob fixed on the valve stem in engagement with one terminal of the screw plug and adapted to rotate the valve stem independently of the screw plug, to effect a plurality of complete rotations of the valve plug in contact with the valve seat of the valve body.

5. In combination with an acetylene lamp container divided by a horizontal partition into an upper water chamber and a lower carbid chamber, of valve mechanism comprising a vertically disposed tube substantially free from lateral projections projecting centrally through the container and partition and extending from the top wall of the container to a point adjacent to but spaced from the bottom wall of the container, said tube terminating at its lower end in an outwardly disposed valve seat and having internal threads at its upper end, and also having a water intake opening at a point adjacent to but above the partition, a hand engaging part, an adjusting plug fixed to the hand engaging part and having peripheral threads to engage the threads of the tube, a valve stem projecting continuously through the tube and having at its lower end a valve disposed below said seat of the tube, a hand engaging knob secured to the upper end of the valve stem, which latter projects loosely through said plug for free rotatable and lengthwise movement, said knob being adapted to rest upon the plug normally whereby as the plug is adjusted to adjust the valve, and whereby to permit of the valve through the medium of said knob to be independently moved into contact with said seat and rotate over the seat.

6. In combination with an acetylene lamp casing having an upper fluid chamber, and a lower carbid chamber, separated from one another by a horizontally disposed partition, of a straight line valve mechanism comprising a tube extending through the water chamber into the carbid chamber, having apertures formed therein for the entrance of fluid at a point adjacent the base of the fluid chamber, said tube having its upper end internally threaded and its lower end provided with an outwardly disposed valve seat, a screw plug rotatably engaged with the upper end of the tube formed to permit ready rotation of the plug, a valve stem rotatably and longitudinally mounted in the plug and provided at its lower end with a coöperating valve for the valve seat, a hand engaging part on the stem at a point above said plug, and resilient means operatively associated with the valve stem arranged to normally force the valve to an open position, and into position, to be moved by the adjustment of the plug.

In witness whereof I have hereunto signed my name at Springfield, Illinois, this 18th day of May, A. D. 1917.

GEORGE R. SHANKLIN.

Witnesses:
    MYRA THOMPSON,
    CARL B. HAGELE.